(12) United States Patent
Wachs et al.

(10) Patent No.: US 8,455,392 B2
(45) Date of Patent: Jun. 4, 2013

(54) TUNGSTATED ZIRCONIA NANOCATALYSTS

(75) Inventors: Israel E. Wachs, Bridgewater, NJ (US); Elizabeth I. Ross-Medgaarden, West Grove, PA (US); Michael Sha-nang Wong, Houston, TX (US)

(73) Assignees: William Marsh Rice University, Houston, TX (US); Lehigh University, Bethlehem, PA (US)

( * ) Notice: Subject to any disclaimer, the term of this patent is extended or adjusted under 35 U.S.C. 154(b) by 269 days.

(21) Appl. No.: 12/665,692

(22) PCT Filed: Jun. 20, 2008

(86) PCT No.: PCT/US2008/067780
§ 371 (c)(1),
(2), (4) Date: Nov. 10, 2010

(87) PCT Pub. No.: WO2008/157812
PCT Pub. Date: Dec. 24, 2008

(65) Prior Publication Data
US 2011/0059842 A1    Mar. 10, 2011

Related U.S. Application Data

(60) Provisional application No. 60/945,491, filed on Jun. 21, 2007.

(51) Int. Cl.
*B01J 23/00*     (2006.01)
*C01G 25/02*    (2006.01)
*C01G 41/02*    (2006.01)

(52) U.S. Cl.
USPC . 502/308; 502/349; 423/594.12; 423/594.13; 977/773; 977/776

(58) Field of Classification Search
USPC ............... 423/594.12, 594.13; 502/305, 308, 502/349; 977/773, 776
See application file for complete search history.

(56) References Cited

U.S. PATENT DOCUMENTS
5,401,478 A    3/1995 Chang et al.
(Continued)

FOREIGN PATENT DOCUMENTS
EP    1651345    5/2006
JP    2006526502    11/2006
WO    PCT/US08/67780    12/2008

OTHER PUBLICATIONS

Sun et al., "Controllable synthesis, characterization and catalytic properties of WO3/ZrO2 mixed oxides nanoparticles", Journal of Colloid and Interface Science 266 (2003) 99-106.*

(Continued)

*Primary Examiner* — Colleen Dunn
*Assistant Examiner* — Anthony J Zimmer
(74) *Attorney, Agent, or Firm* — Boulware & Valoir

(57) ABSTRACT

A new type of solid acid catalyst, which promises better catalytic performance than conventionally prepared supported metal oxides due to its precisely synthesized nanostructure has been described. The catalyst is nanoparticulate in form and is comprised of monolayers of tungstated zirconia of the formula, $WO_xZr_yO_{4-2y}$ made by impregnating a support with zirconium and tungsten. The support catalyst is further characterized in having a tugsten monolayer between greater than 0001 $W/nm^2$ to about 30 $W/nm^2$.

3 Claims, 5 Drawing Sheets

Supported $WZrO_2$ Active Sites

Supported WZrOH and $(WO_x+ZrO_x)/WZrO_2$ Active Sites

U.S. PATENT DOCUMENTS

| | | |
|---|---|---|
| 5,453,556 A | 9/1995 | Chang et al. |
| 5,543,036 A | 8/1996 | Chang et al. |
| 5,552,128 A | 9/1996 | Chang et al. |
| 5,563,310 A | 10/1996 | Chang et al. |
| 2003/0095908 A1 | 5/2003 | Pinnavaia et al. |
| 2005/0150819 A1 | 7/2005 | Wachs et al. |
| 2007/0009417 A1 | 1/2007 | Wong et al. |

OTHER PUBLICATIONS

Kameswari et al., "Rapid synthesis of ZrW2O8 and related phases, and structure refinement of ZrWMoO8", International Journal of Inorganic Materials 2 (2000) 333-337.* www.zrchem.com/products/doped_zirconium_hydroxides.asp, Doped Zirconium Hydroxides, Mel Chemicals.

* cited by examiner

Supported WZrO$_2$ Active Sites

Surface WO$_x$ Species
(< 5 W/nm$^2$)

Surface WO$_x$ Species &
& WO$_3$ NPs
(> 5 W/nm$^2$)

Supported WZrOH and (WO$_x$+ZrO$_x$)/WZrO$_2$ Active Sites

Surface WO$_x$ Species &
*Zr-Stabilized WO$_3$ NPs*
(< 5 W/nm$^2$)

Surface WO$_x$ Species &
*Zr-Stabilized WO$_3$ NPs*
& WO$_3$ NPs
(> 5 W/nm$^2$)

TUNGSTATED ZIRCONIA NANOCATALYSTS

CROSS-REFERENCE TO RELATED APPLICATIONS

This application is a 35 U.S.C. Section 371 of PCT/US2008/067780 filed Jun. 20, 2008, which claims priority to U.S. Provisional Application No. 60/945,491 filed Jun. 21, 2007, both of which are incorporated by reference herein in their entirety.

FEDERALLY SPONSORED RESEARCH STATEMENT

This invention was made with government support under Grant Number CMS-0609018 awarded by the National Science Foundation. The government has certain rights in the invention.

REFERENCE TO MICROFICHE APPENDIX

Not applicable.

FIELD OF THE INVENTION

The invention relates to solid acid catalysts containing $Zr_yO_{4-2y}$-supported $WO_x$.

BACKGROUND OF THE INVENTION

Supported metal oxide catalysts are one of the major forms of materials used as heterogeneous catalysts. They are composed of an active material deposited on the surface of a high-surface area support, with the nominal purpose of achieving high dispersion of the active material. However, the support material may contribute to catalysis also, by providing or generating new active sites. With compositions spanning across the Periodic Table, supported metal oxide catalysts are found in industrial chemical processes, commercial applications, and environmental protection, such as automobile catalytic converters, $NO_x$ reduction from power plants, petroleum refining, drug manufacture, and petrochemicals processing.

There has been recent interest in surface acid properties of the $ZrO_2$-supported $WO_x$ catalyst system due to the low temperature activity of such catalysts for light alkane isomerization. Although less active than sulfated zirconia catalysts, the enhanced stability of $ZrO_2$-supported $WO_x$ solid acid catalysts offers an alternative catalyst for practical industrial applications. Such systems are disclosed in U.S. Pat. Nos. 5,401,478; 5,453,556; 5,543,036; 5,552,128; and 5,563,310, the disclosures of which are incorporated herein by reference in their entirety.

Recent investigations into the nature of the tungsten oxide catalytic active sites present in $Zr_x(OH)_{4-2x}$ supported $WO_3$ catalysts revealed that Zr-stabilized distorted $WO_3$ nanoparticles (NPs) are responsible for the enhanced catalytic performance of $Zr_x(OH)_{4-2x}$ supported $WO_3$ catalysts over model $ZrO_2$ supported $WO_3$ catalysts. The model $ZrO_2$ supported $WO_3$ catalyst consists of a supported tungsten oxide phase containing surface $WO_x$ species and crystalline $WO_3$ NPs on a crystalline monoclinic-$ZrO_2$ support.

The preparation methods for catalysts typically involve soaking the support metal oxide in a solution containing the solubilized precursors of the metal oxide to be supported. Drying causes the precursor to adsorb on the surface of the support metal oxide and calcination at high temperatures converts it to a metal oxide. Methods to improve surface area of active catalyst and ensure complete coverage of support materials are required to increase catalytic efficiency and stability.

SUMMARY OF THE INVENTION

A new type of solid acid catalyst that delivers better catalytic performance than conventionally prepared supported metal oxides due to a precisely synthesized nanostructure. The precisely synthesized nanostructure contains $Zr_yO_{4-2y}$ (wherein y is 1) supported $WO_x$ (wherein $WO_x$ by convention signifies that varying stoichiometries may occur) nanoparticles that improve catalytic activity and stability. Novel $Zr_yO_{4-2y}$ supported $WO_x$ nanoparticles (NPs) are prepared through modification of the catalyst impregnation process.

Zr-stabilized distorted $WO_3$ NPs are generated through co-impregnation of $WO_x$ and $ZrO_x$ precursors onto the model supported $WO_3/ZrO_2$ catalysts that are initially free of Zr—$WO_3$ NPs. Using the techniques described herein solid catalysts are generated that improve the catalytic activity. For example, Turnover Frequency (TOF) for methanol dehydration to dimethyl ether (DME) is improved by greater than $10^2$ DME molecules per exposed tungsten site per second. Zr-stabilized distorted $WO_3$ NPs introduced into the model $ZrO_2$ supported $WO_3$ catalysts are responsible for the enhanced surface acidic properties of supported $WO_3/Zr_x(OH)_{4-2x}$ catalytic materials.

A nanocatalyst of the present invention may be formed by impregnating an uncalcined $SiO_2$, $Al_2O_3$, $ZrO_2$ or other ceramic support with any binary combination of precursors from Groups 4, 5, 6, 7, 8, 9, 10, 13, or 14 of the periodic table. In a preferred embodiment, a binary combination of precursors from Groups 4, 5, 6, 7, 8, 9, 10, 13, or 14 of the periodic table are impregnated on an uncalcined $ZrO_2$ support. In a most preferred embodiment, W and Zr are impregnated on an uncalcined $ZrO_2$ support to give supported nanoparticles of $WO_x$—$Zr_yO_{4-2y}$.

The following notation is employed to express the model supported tungsten oxide samples: x$WZrO_2$-723 K, in which x is the surface density (W-atoms/nm$^2$), $ZrO_2$ represents the crystalline monoclinic (m)-$ZrO_2$ support and 723 K refers to the calcination temperature in degrees Kelvin (K). With a variety of impregnation ratios and supports, this nomenclature is expanded to "$(n^aWO_x+mZrO_x)/n^b$ $WZrO_2$–973" where $n^a+n^b$=total W-atoms/nm$^2$.

In one embodiment, a method of making a catalyst comprising impregnating a substrate with W precursor and Zr precursor to form an impregnated support, and calcining the impregnated support to generate a $WO_xZr_yO_{4-2y}$ nanoparticle catalyst is disclosed. The method includes making a catalyst by impregnating the support with zirconium oxide and impregnating the support with tungsten oxide to form an impregnated support and calcining the ZrW-impregnated support to generate a catalyst with WOxZryO4-2y nanoparticles. The support may be impregnated with tungsten precursor or zirconium precursor first or the support may be coimpregnated with both precursors prior to calcining. In one embodiment the Zr precursor is zirconium tert-butoxide, $Zr[OC(CH_3)_3]_4$. In another embodiment, the W precursor is ammonium metatungstate $(NH_4)_{10}W_{12}O_{41}.5H_2O$. Supports may contain a variety of materials including $SiO_2$, $Al_2O_3$, $ZrO_2$, $WO_3$, $WZrO_2$, 4 $WZrO_2$, $WO_x$, $ZrO_x$, $Zr_yO_{4-2y}$. The support materials may be single, bi-, or multi-composite materials. Example supports are $WO_x/SiO_2$, $WO_x/Al_2O_3$, or $WO_x/(SiO_2$—$Al_2O_3)$, as well as $ZrO_2$, $WZrO_2$, or $WO_xZr_yO_{4-2y}$.

In a preferred embodiment of the invention, tungsten zirconium oxide nanoparticle catalysts of the formula $WO_xZr_yO_{4-2y}$ are generated by impregnating Zr and W together to form some monolayer coverage of the support. In one embodiment the tungsten is impregnated to a density of about 0.001 $W/nm^2$ to about 30 $W/nm^2$, preferably a density of about 4.5 $W/nm^2$ to about 10 $W/nm^2$, most preferably about 5 $W/nm^2$. Final tungsten density may be approximately 0.001 $W/nm^2$, 0.01 $W/nm^2$, 0.1 $W/nm^2$, 1 $W/nm^2$, 2 $W/nm^2$, 3 $W/nm^2$, 4 $W/nm^2$, 5 $W/nm^2$, 6 $W/nm^2$, 7 $W/nm^2$, 8 $W/nm^2$, 9 $W/nm^2$, 10 $W/nm^2$, 15 $W/nm^2$, 20 $W/nm^2$, 25 $W/nm^2$, 30 $W/nm^2$, or greater.

In the present invention, a tungsten base layer like $WZrO_2$, or other support described above, will form some monolayer coverage of tungsten zirconium nanoparticles of ($WO_xZr_yO_{4-2y}$) of the catalyst composition when impregnated with Zr and W together. The tungsten base layer may have a tungsten density from about 0.001 $W/nm^2$ to about 30 $W/nm^2$, about 2.5 $W/nm^2$ to about 10 $W/nm^2$, about 3.9 $W/nm^2$ to about 7.9 $W/nm^2$, about 4.5 $W/nm^2$ to about 6 $W/nm^2$, and about 5 $W/nm^2$. The initial concentration of base layer tungsten may be approximately 0.001 $W/nm^2$, 0.01 $W/nm^2$, 0.1 $W/nm^2$, 1 $W/nm^2$, 2 $W/nm^2$, 3 $W/nm^2$, 4 $W/nm^2$, 5 $W/nm^2$, 6 $W/nm^2$, 7 $W/nm^2$, 8 $W/nm^2$, 9 $W/nm^2$, 10 $W/nm^2$, 15 $W/nm^2$, 20 $W/nm^2$, 25 $W/nm^2$, 30 $W/nm^2$, or greater.

A catalyst composition of the present invention has tungsten zirconium oxide nanoparticles of the formula $WO_xZr_yO_{4-2y}$ with a nanocrystal structure.

DESCRIPTION OF EMBODIMENTS OF THE INVENTION

Figure 1:
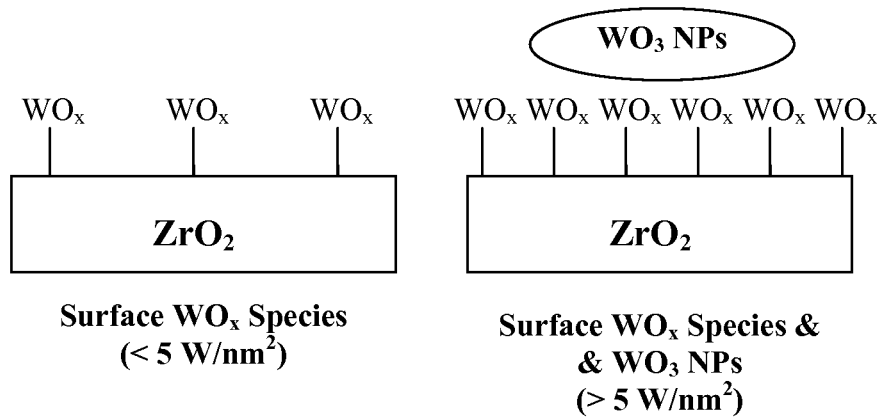
FIG. 1: Schematic of Monotungstate and Polytungstate Active Sites. A schematic representing catalytic active sites present in two types of $ZrO_2$-supported $WO_3$ catalysts, depending on tungsten oxide surface density and preparation method. Surface $WO_x$ species represents monotungstate O=W(—O—)$_4$ and polytungstate surface species, with the latter predominating above low surface $WO_x$ coverage.
Figure 1:
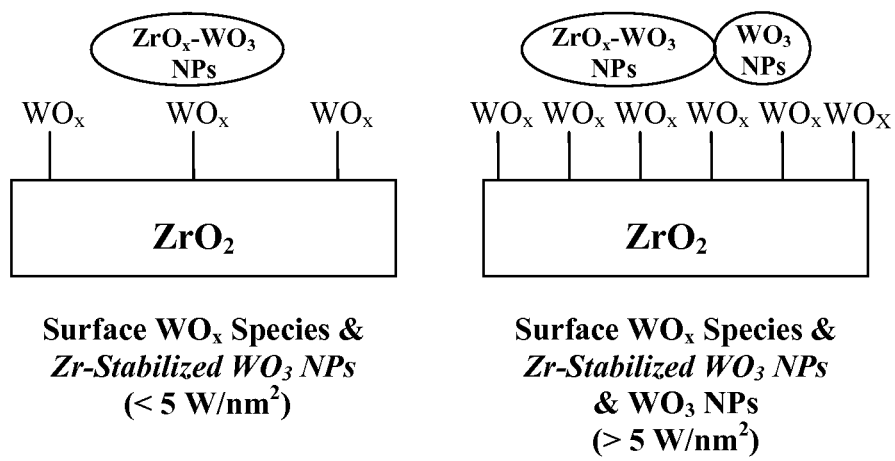

As used herein, the term "model supported $WO_3/ZrO_2$ catalyst" means a catalyst including a tungsten oxide phase containing surface $WO_x$ species and crystalline $WO_3$ nanoparticles supported on a crystalline monoclinic-$ZrO_2$ support.

As used herein, the term "TOF" means turnover frequency.

As used herein, the term "WZr TOF" means enhancement in catalytic activity of embodiments of the inventive catalyst as a function of surface density.

Uncalcined supports are available commercially from CORNING®, ALCOA®, DYTECH®, SAINT-GOBAIN® and others. Supports may be made of alumina, titania, zirconia, silica, alumina-silica, silica-carbide, zirconium-silicate, silicon-nitride, titanium dioxide (rutile, anatase, or other polymorph).

Nanocrystals of the formula $WO_x$—$ZrO_y$ are provided that improve catalytic activity. The nanocrystal catalysts of the present invention are useful as drop-in replacements for existing solid acid catalysts in current industrial catalytic processes, petroleum refining processes, and catalytic converters.

The invention provides catalysts comprising nanoparticles of at least one transition metal oxide and a second oxide material. Any transition metal can be used. Particular embodiments include at least one transition metal oxide formed from any element from Groups 3 to Group 10 including the lanthanides and actinides. Typically tungsten oxide is used. Any oxide material can be used as the second oxide material. Transition metal oxides formed from any element from Groups 3 to Group 10 including the lanthanides and actinides may be used as the second oxide material. In particular embodiments, the second oxide is zirconium oxide.

Some embodiments of the invention provide tungstated catalysts produced by the introduction of Zr-stabilized distorted $WO_3$ NPs by co-impregnation of $WO_x$ and ZrOx precursors onto the model supported $WO_3/ZrO_2$ catalyst that is initially free of Zr—$WO_3$ NPs.

When Zr and W are impregnated together above monolayer coverage on model supported $WO_3/ZrO_2$ catalysts, an inventive highly active catalyst is formed. As used herein, such inventive highly active catalysts are referred to by the term "($WO_x$+$ZrO_x$)/$WZrO_2$." Without being bound to any theory, the high activity of the inventive catalysts suggests that "$WO_xZr_yO_{4-2y}$" NPs are being formed and that such particles are catalytically superactive. "$WO_xZr_yO_{4-2y}$" designates a mixed composition of unknown stoichiometries of tungsten and zirconium. These catalysts exhibit enhanced activity and possibly enhanced selectivity, thermal stability, and resistance to deactivation relative to conventional supported metal oxides.

Some embodiments of the invention provide methods of manufacturing $WO_xZrO_y$ nanocrystal catalysts.

The basic steps of such embodiments are as follows: a high surface area metal oxide, in the form of a powder, is impregnated with the precursor to the supported metal oxide. The resulting material is calcined at high temperatures. The combination of precursor amount and calcination conditions is such that one monolayer (or less) of metal oxide is deposited. The resulting material is then subsequently impregnated with a mixture of two precursors (one precursor is to the same supported metal oxide and the other precursor is to the high surface area metal oxide). A double-impregnated/calcined catalyst (which contains the supported metal oxide in nanoparticle form) is generated after calcination at high temperatures.

Example 1

Catalyst Synthesis

Comparative Example 1

Preparation of Model Supported $Wo_3/ZrO_2$ Catalysts

Model supported $WO_3/ZrO_2$ catalysts were synthesized by incipient-wetness impregnation of aqueous ammonium metatungstate solutions, $(NH_4)10W_{12}O_{41}.5H_2O$ (PFALTZ & BAUER®, 99.5% purity), onto a crystalline monoclinic $ZrO_2$ support (DEGUSSA®, BET=60 $m^2$/g). The samples were initially dried overnight under ambient conditions, further dried under flowing air (Airgas®, ZERO GRADE™) at 393 K for 1 h and subsequently calcined in flowing air (AIRGAS®, ZERO GRADE™) at 723 K for 4 h. The following notation is employed to express the model supported tungsten oxide samples: $xWZrO_2$-723 K, in which x is the surface density (W-atoms/$nm^2$), $ZrO_2$ represents the crystalline monoclinic (m)-$ZrO_2$ support and 723 K refers to the calcination temperature in degrees Kelvin (K). For example, 4.5 $WZrO_2$-750 K represents a surface tungsten oxide density of 4.5 W-atoms/$nm^2$ prepared at a calcination temperature of 750 K on the crystalline m-$ZrO_2$ support (the model supported $WO_3/ZrO_2$ catalyst). Surface tungsten oxide coverage and loading for the model supported $WO_3/ZrO_2$ catalysts are known in the art. As schematically shown in FIG. 1, the model supported $WO_3/ZrO_2$ catalyst contains $WO_x$ surface species below 5 W-atoms/$nm^2$ and WO), surface species and $WO_3$ NPs above W-atoms/$nm^2$.

Example 1.2

Preparation of $(WO_x+ZrO_x)WO_3/ZrO_2$ Catalysts

Inventive $(WO_x+ZrO_x)WO_3/ZrO_2$ catalysts with various surface $\rho_{W,surf}$ and $\rho_{Zr,surf}$ density values were prepared via a two-step incipient-wetness impregnation procedure. In the first step, aqueous solutions of ammonium metatungstate, $(NH_4)10W_{12}O_{41}.5H_2O$ (PFALTZ & BAUER®, 99.5% purity) were impregnated onto the selected model supported $WO_3/ZrO_2$ catalysts and dried overnight under ambient conditions. In the second step, a toluene solution of zirconium tert-butoxide, $Zr[OC(CH_3)_3]_4$ (ALFA AESAR®, 97%) was further impregnated under a $N_2$ environment (AIRGAS®, Ultra High Purity) in a glove-box (VACUUM ATMOSPHERES®, OMNI-LAB VAC 101965™). After the two impregnation steps, the catalyst samples were allowed to dry overnight at room temperature under the nitrogen atmosphere. The catalyst samples were initially heated under flowing $N_2$ at a temperature ramp rate of 1 K/min to 393 K (THERMOLYNE®, Model 48000). The catalyst samples were held at 393 K for 1 h in flowing $N_2$ and then another hour in flowing air (AIRGAS®, Zero grade). Subsequently, the temperature was further raised to 973 K (700° C.) with a ramp rate of 1 K/min and held at 973 K (700° C.) for 4 h in the flowing air environment. The following notation is employed to express the co-impregnated $WO_x+ZrO_x$ supported tungsten oxide samples: $(mW+nZr)/xWZrO_2$-973 K, where m is the surface W-atoms/$nm^2$ density of the additionally impregnated surface $WO_x$, n is the surface Zr-atoms/$nm^2$ density of the additional surface ZrO, impregnated and x is the initial surface W-atoms/$nm^2$ density of tungsten oxide in the model supported catalysts. For example, (3.5 W+3.5 Zr)/2.5 $WZrO_2$-973 K represents a surface density of 2.5 W-atoms/$nm^2$ for the model supported $WO_3/ZrO_2$ catalyst, with an additional surface 3.5 W-atoms/$nm^2$ and 3.5 Zr-atoms/$nm^2$ added and then calcined at 973 K. For several samples either W (m=0) or Zr (n=0) were only introduced in order to better understand the interactions between these two additives. The various surface $WO_x$ and $ZrO_x$ coverage and loading of the co-impregnated catalysts on the model supported $WO_3/ZrO_2$ catalysts are listed in Table 1.

As schematically shown in FIG. 1, the model supported $WO_3/ZrO_2$ catalyst containing additional W and Zr also has $WO_x$ species, and, depending on total W surface density, $WO_3$ NPs also. The uniqueness here is that the special preparation method can generate the additional surface species of Zr-stabilized $WO_3$ NPs. It is hypothesized that conventionally prepared $WO_3/ZrO_2$ (which is prepared similarly to model supported $WO_3/ZrO_2$ catalyst except that zirconium hydroxide is used instead of crystalline $ZrO_2$) has a similar nanostructure except that the relative amount of Zr-stabilized $WO_3$ NPs is not controlled.

Example 2

Catalyst Characterization

A variety of the inventive $(WO_x+ZrO_x)WO_3/ZrO_2$ catalysts were characterized by Brunauer, Emmett, and Teller (BET) surface area calculations to determine gas uptake, micropore volume (t-plot method), and pore size distribution via adsorption and desorption isotherms. In situ Raman spectroscopy a light scattering technique was also used to study molecular vibrations in a sample similar to infrared spectroscopy.

BET Surface Area

The BET surface area values of the catalyst samples were determined by $N_2$ adsorption isotherms (77 K) (−196° C.) collected on a QUANTASORB™ surface area analyzer (QUANTACHROME® Corp., Model OS-9™). Sample pretreatment consisted of evacuation at 523 K (250° C.) before $N_2$ adsorption (QUANTACHROME® Corp., Model QT-3™).

TABLE 1

BET Surface Area, Ratio W:Zr Added and Total Tungsten Oxide Surface Density
(W-atoms/$nm^2$) of the Co-Impregnated "Model" Zirconia-
Supported Tungsten Oxide Catalysts.

| Sample | BET S.A. ($m^2$/g) | W-atoms/$nm^2$ Added | Zr-atoms/$nm^2$ Added | Ratio W:Zr Added | Total W-atoms/$nm^2$ |
|---|---|---|---|---|---|
| 2.5$WZrO_2$-723 K | 59.4 | — | — | — | 2.5 |
| (1.5W + 1.5Zr)/2.5$WZrO_2$-973 K | 56.08 | 1.5 | 1.5 | 1:1 | 5 |
| (3.5W + 3.5Zr)/2.5$WZrO_2$-973 K | 51.9 | 3.5 | 3.5 | 1:1 | 6 |

TABLE 1-continued

BET Surface Area, Ratio W:Zr Added and Total Tungsten Oxide Surface Density (W-atoms/nm²) of the Co-Impregnated "Model" Zirconia-Supported Tungsten Oxide Catalysts.

| Sample | BET S.A. (m²/g) | W-atoms/nm² Added | Zr-atoms/nm² Added | Ratio W:Zr Added | Total W-atoms/nm² |
|---|---|---|---|---|---|
| (3.5W + 7Zr)/2.5WZrO₂-973 K | 49.6 | 3.5 | 7 | 1:2 | 6 |
| (3.5W)/2.5WZrO₂-973 K | 48.9 | 3.5 | — | — | 6 |
| (3.5Zr)/2.5WZrO₂-973 K | 51.9 | — | 3.5 | — | 2.5 |
| (3.5W)/(3.5Zr)/2.5WZrO₂-973 K | 48.9 | 3.5 | 3.5 | 1:1 | 6 |
| 4WZrO₂-723 K | 58.7 | — | — | — | 4 |
| (2W + 2Zr)/4WZrO₂-973 K | 56.2 | 2 | 2 | 1:1 | 6 |
| (2W + 4Zr)/4WZrO₂-973 K | 56.3 | 2 | 4 | 1:2 | 6 |
| (2Zr)/4WZrO₂-973 K | 53.7 | — | 2 | — | 4 |
| 3.9WZrO₂-723 K | 58.7 | — | — | — | 3.9 |
| (4W + 0.4Zr)/3.9WZrO₂-973 K | 41.7 | 4 | 0.4 | 10:1 | 7.9 |
| (4W + 0.7Zr)/3.9WZrO₂-973 K | 40.5 | 4 | 0.7 | ~6:1 | 7.9 |
| (4W + 1Zr)/3.9WZrO₂-973 K | 39.1 | 4 | 1 | 4:1 | 7.9 |
| (6W + 0.6Zr)/3.9WZrO₂-973 K | 37.77 | 6 | 0.6 | 10:1 | 9.9 |
| 6WZrO₂-723 K | 54.5 | — | — | — | 6 |
| (2Zr)6WZrO₂-973 K | 59.5 | — | 2 | — | 6 |
| 4.5WZrO₂-723 K | 55.6 | — | — | — | 4.5 |
| (1.5W + 0.15Zr)/4.5WZrO₂-973 K | 59.8 | 1.5 | 0.15 | 10:1 | 6 |
| (1.5W + 0.375Zr)/4.5WZrO₂-973 K | 59.8 | 1.5 | 0.375 | 4:1 | 6 |
| (1.5W + 0.5Zr)/4.5WZrO₂-973 K | 59.9 | 1.5 | 0.50 | 3:1 | 6 |
| (1.5W + 0.75Zr)/4.5 WZrO₂-973 K | 59.5 | 1.5 | 0.75 | 2:1 | 6 |
| 7.6WZrO₂-723 K | 49 | — | — | — | 7.6 |
| 9.5WZrO₂-723 K | 45.3 | — | — | — | 9.5 |

The BET surface area along with the ratio of surface $WO_x$ and $ZrO_x$ added to the model supported $WO_3/ZrO_2$ catalysts are listed in Table 1. The BET surface area was slightly decreased due to the additional mass of the surface $MO_x$ species (M=W or Zr). The total surface $\rho_{W,surf}$ density (W-atoms/nm²) was calculated by adding the introduced $\rho_{W,surf}$ to the original W $\rho_{W,surf}$ of each catalyst.

3.2 In situ Raman Spectroscopy

In situ Raman spectroscopy was used to obtain the molecular structures of the dehydrated supported tungsten oxide catalysts with a visible (532 nm) laser excitation on a single stage HORIBA-JOBIN YVON LAB RAM-HR™ Raman spectrometer equipped with a confocal microscope (OLYMPUS® BX-30™) and a notch filter (KAISER® SUPER NOTCH™). The visible excitation was generated by a Nd—YAG doubled diode pumped laser (COHERENT COMPASS® 315M-150; output power of 150 mW with 10 mW at the sample). The scattered photons were directed into a single monochromator and focused onto a UV-sensitive liquid-$N_2$ cooled CCD detector (HORIBA-JOBIN YVON CCD-3000V™) with a spectral resolution of ~2 cm$^{-1}$ for the given parameters. The Raman spectrometer was also equipped with an environmentally-controlled high temperature cell reactor (LINKAM®, TS1500™) that examined the catalyst samples in loose powder form (~5-10 mg) and also allowed for control of both the temperature and gaseous composition. In situ Raman spectra was collected for the supported tungsten oxide catalysts after dehydration at 723 K (450° C.) for 1 h in flowing 10% $O_2$/He (AIRGAS®, certified, 9.735% $O_2$/He, ultra-high purity and hydrocarbon-free, 30 mL/min) to desorb the adsorbed moisture and after cooling the catalysts back to 393 K (120° C.). The spectral acquisition time employed was 20 scans of 20 seconds/scan for a total of ~7 min/spectrum. System alignment was verified daily using a JOBIN YVON-supplied silica reference standard.

Figure 2:
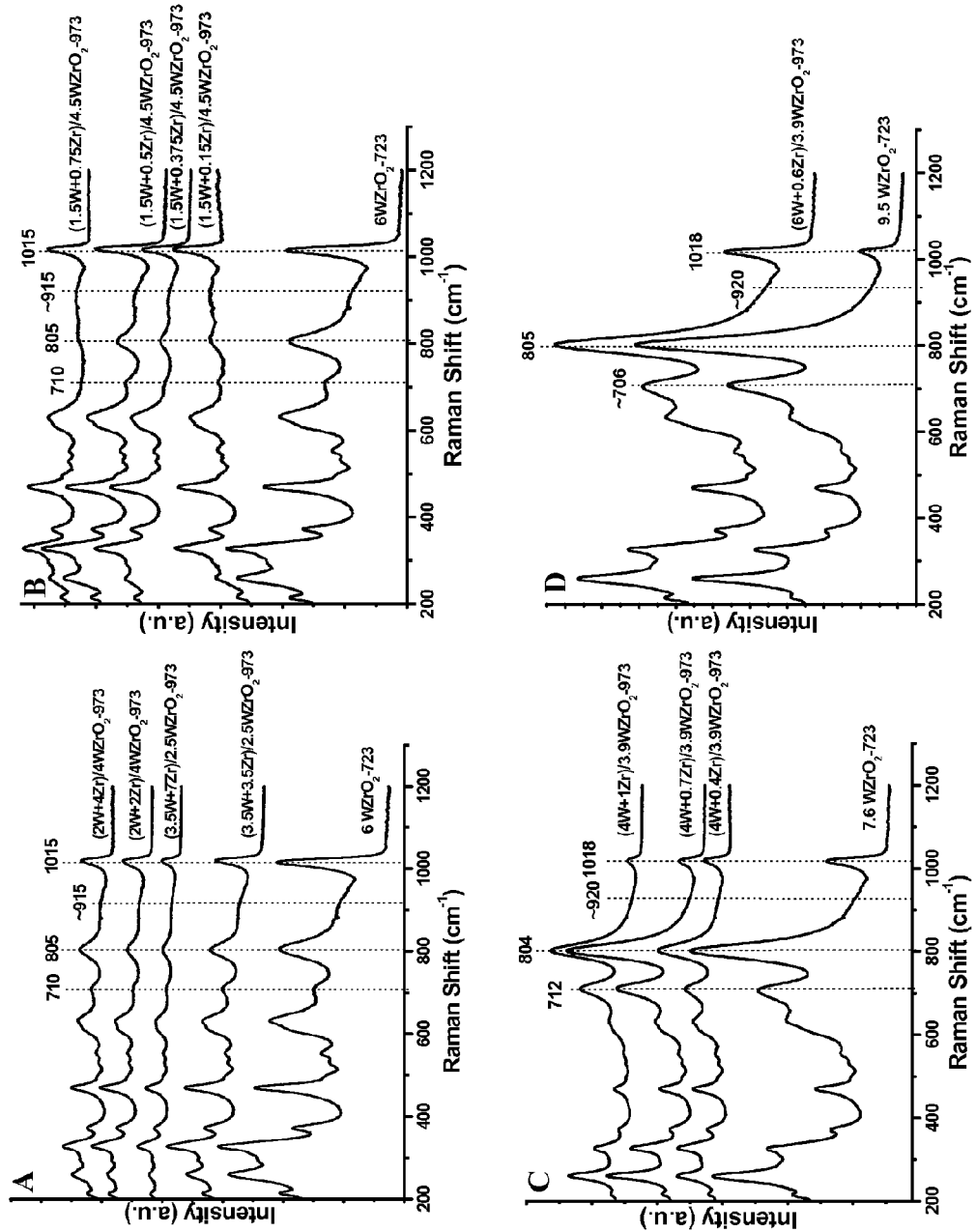
FIG. 2 are Raman spectra (532 nm) under dehydrated conditions as a function of surface tungsten oxide coverage (W-atoms/$nm^2$) of co-impregnated ($WO_x$+$ZrO_2$)-zirconia-supported tungsten oxide.

The In situ Raman spectra of the co-impregnated ($WO_x$+$ZrO_x$)$WO_3/ZrO_2$ catalysts under dehydrated conditions are shown in FIG. 2 along with their corresponding model catalysts at the same surface $\rho_{W,surf}$ density. The Raman bands at 180 (s), 192 (s), 220 (w), 308 (w), 335 (m), 349 (m), 383 (m), 476 (s), 503 (w), 539 (w), 561 (w), 617 (m), 638 (m) and 756 (w) cm$_{-1}$ correspond to vibrations of the crystalline m-$ZrO_2$ support. All the supported $WO_3/ZrO_2$ catalyst samples in FIG. 2A-D, with $\rho_{W,surf}$ from 6 to 10 W/nm², exhibit a Raman band at ~1015-1018 cm$^{-1}$ characteristic of the mono-oxo terminal W=O bond of dehydrated surface $WO_5/WO_6$ polytungstate species. The Raman bands at ~805, ~710 and ~270 cm$^{-1}$ reflect the presence of crystalline $WO_3$ NPs, which is consistent with the greater coverage than the monolayer surface with a $\rho_{W,surf}$ ~4.5 W-atoms/nm². The Raman band at ~915 cm$^{-1}$ is present for all co-impregnated catalysts and is characteristic of bridging W—O—Zr bonds. The presence of the ~915 cm$^{-1}$ Raman band along with a band at ~820-850 cm$^{-1}$ reflects the presence of Zr-stabilized distorted $WO_3$ NPs. The second band at ~820-850 cm$^{-1}$ is not readily apparent in FIG. 2A-D since this band is overshadowed by the very prominent crystalline $WO_3$ band at 805 cm$^{-1}$. The apparent absence of this characteristic Raman band for the Zr-stabilized $WO3$ NPs, suggest that only a few new sites have been introduced onto the surface of the model supported $WZrO_2$ catalyst.

3.3 In situ UV-vis Diffuse Reflectance Spectroscopy (DRS)

The electronic structures of the zirconia supported tungsten oxide catalysts were obtained with a VARIAN CARY® 5E UV-vis spectrophotometer employing the integration sphere diffuse reflectance attachment (HARRICK® PRAYING MANTIS ATTACHMENT, DRA-2™). The finely ground powder catalyst samples (~20 mg) were loaded into the In situ cell (HARRICK®, HVC-DR2™) and measured in the 200-800 nm region with a magnesium oxide reflectance standard used as the baseline. The UV-vis spectra of the supported tungsten oxide catalysts were obtained after the samples were treated at 673 K (400° C.) for 1 h in flowing 10% $O_2$/He (AIRGAS®, certified, 9.735% $O_2$/He, ultra-high purity and hydrocarbon-free, 30 mL/min) to desorb the adsorbed moisture. Below 300 nm, the absorbance signal was unacceptably noisy and a filter (VARIAN®, 1.5ABS™) was employed to minimize the background noise.

The UV-vis spectra were processed using MICROSOFT® EXCEL™ to calculate the Kubelka-Monk function $F(R_\infty)$ extracted from the UV-vis DRS absorbance. The edge energy ($E_g$) for allowed transitions was determined by finding the intercept of the straight line in the low-energy rise of a plot of $[F(R_\infty)h\nu]^{1/n}$, where n=0.5 for the direct allowed transition, versus h$\nu$, where h$\nu$ is the incident photon energy.

Figure 3:
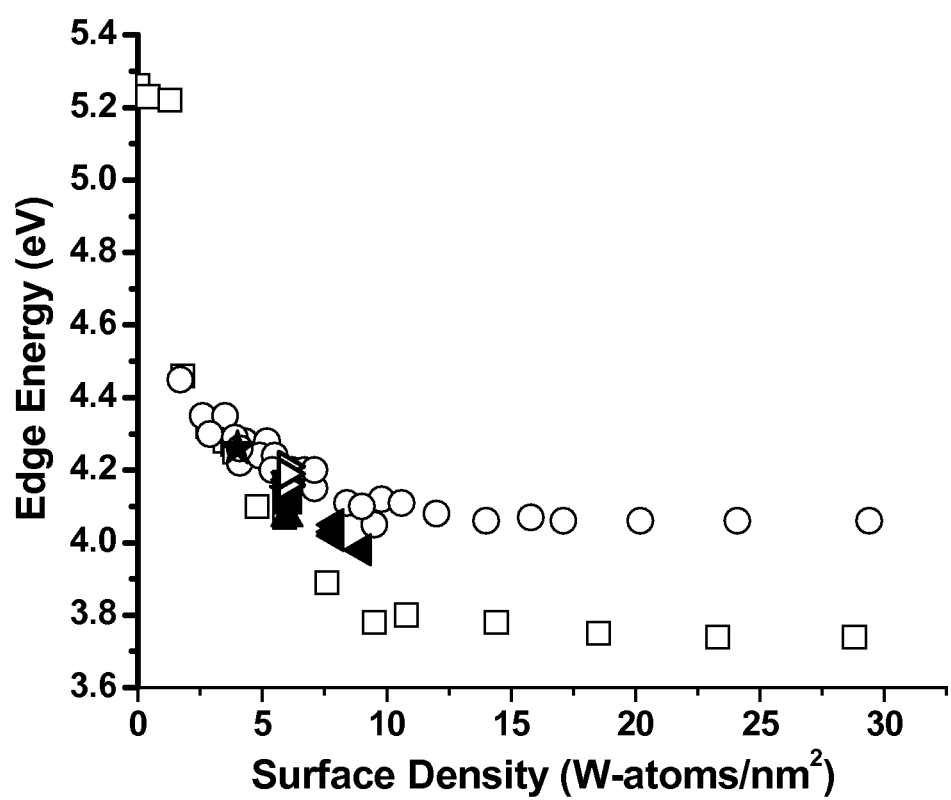
FIG. 3: UV-vis Diffuse Reflectance Spectroscopy (DRS) Edge Energy. A graph depicting UV-vis DRS edge energy, $E_g$ (eV), for supported $WO_3$ catalysts as a function of surface tungsten oxide density (W-atoms/$nm^2$) from 0.01 $W/nm^2$ to 30 $W/nm^2$ for "Model" supported x$WZrO_2$-723 K (□), supported xWZrOH-(773-1173) (○), supported (mW+nZr)/2.5 $WZrO_2$-973 K (■), (mW+nZr)/3.9 $WZrO_2$-973 K (◀), (mW+nZr)/4 $WZrO_2$-973 K (▼), (mW+nZr)/4.5 $WZrO_2$-973 K (▷), (mW)/2.5 $WZrO_2$-973 K (▲) and (nZr)/x$WZrO_2$-973 K (★).

The In situ UV-vis DRS $E_g$ values for the dehydrated $(WO_x+ZrO_x)WO_3/ZrO_2$ catalysts (closed symbols) are compared with the corresponding supported $WO_3/Zr_x(OH)_{4-2x}$ (open circle symbols) and the model supported $WO_3/ZrO_2$ (open square symbols) catalyst systems in FIG. 3 as a function of surface $\rho_{W,surf}$ density. For the model supported $WO_3/ZrO_2$ catalyst system, surface monotungstate species predominate at low surface coverage ($\rho_{W,surf}$<2 W-atoms/nm$^2$), surface polytungstate species predominate at monolayer coverage ($\rho_{W,surf}$ ~4.5 W-atoms/nm$^2$) and crystalline $WO_3$ NPs reside on top of the surface polytungstate monolayer above monolayer coverage. For the supported $WO_3/Zr_x(OH)_{4-2x}$ catalyst system, the same three tungsten oxide structures are also present as a function of $\rho_{W,surf}$ with the addition of Zr-stabilized distorted $WO_3$ NPs at all levels coverage, especially just above monolayer. For the co-impregnated $(WO_x+ZrO_x)/WZrO_2$ catalyst samples containing a final $\rho_{W,surf}$ ~6 W-atoms/nm$^2$, the UV-vis DRS $E_g$ values are essentially indistinguishable (4.12-4.17 eV) and fall in between the values of the model supported 6 $WZrO_2$-723 K (~3.6 eV) and 6 WZrOH (~4.2 eV) catalysts. For the $(WO_x+ZrO_x)/WZrO_2$ catalysts with $\rho_{W,surf}$ values of 7.6 and 9.9 W-atoms/nm$^2$, the UV-vis DRS Eg values are ~4.03 eV and ~3.98 eV, respectively. The UV-vis DRS values for the corresponding model supported 7.6 $WZrO_2$-723 K and 9.5 $WZrO_2$-723 K are ~3.89 and ~3.78, respectively, and ~4.15 and ~4.2 eV, respectively, for the corresponding supported WZrOH catalysts. The UV-vis DRS $E_g$ values for the co-impregnated supported $(WO_x+ZrO_x)/WZrO_2$ catalysts are much closer to those of the corresponding WZrOH catalyst samples than those of the model supported $WZrO_2$ catalysts. This suggests that the electronic structures of the supported $WO_x$ species are similar for supported WZrOH and $(WO_x+ZrO_x)/WZrO_2$ catalyst systems in the region studied.

3.4 Bright Field and High Resolution (HR)-Transmission Electron Microscopy

The samples for bright field (BF) and high resolution electron microscopy (HR-TEM) examination were prepared by dispersing catalyst powder in high purity ethanol, then allowing a drop of the suspension to evaporate on a lacy carbon film supported by a 300 mesh copper TEM grid. BF-TEM images of the ambient samples were obtained using a JEOL 2000FX™ transmission electron microscope and HR-TEM images of the ambient samples were obtained using a JEOL 2200FS™ transmission electron microscope, having an accelerating voltage of 200 kV, a point-to-point resolution of 0.19 nm and an information limit of 0.11 nm. Chemical analysis and Energy Dispersive Spectra (EDS) mapping were collected using a VG 603 DSTEM. EDS are energy-dispersive X-ray spectroscopy spectra collected during electron microscopy by detecting X-ray emissions at a variety of excitation energies. Each element provides characteristic peaks at specific wavelengths.

Figure 4:
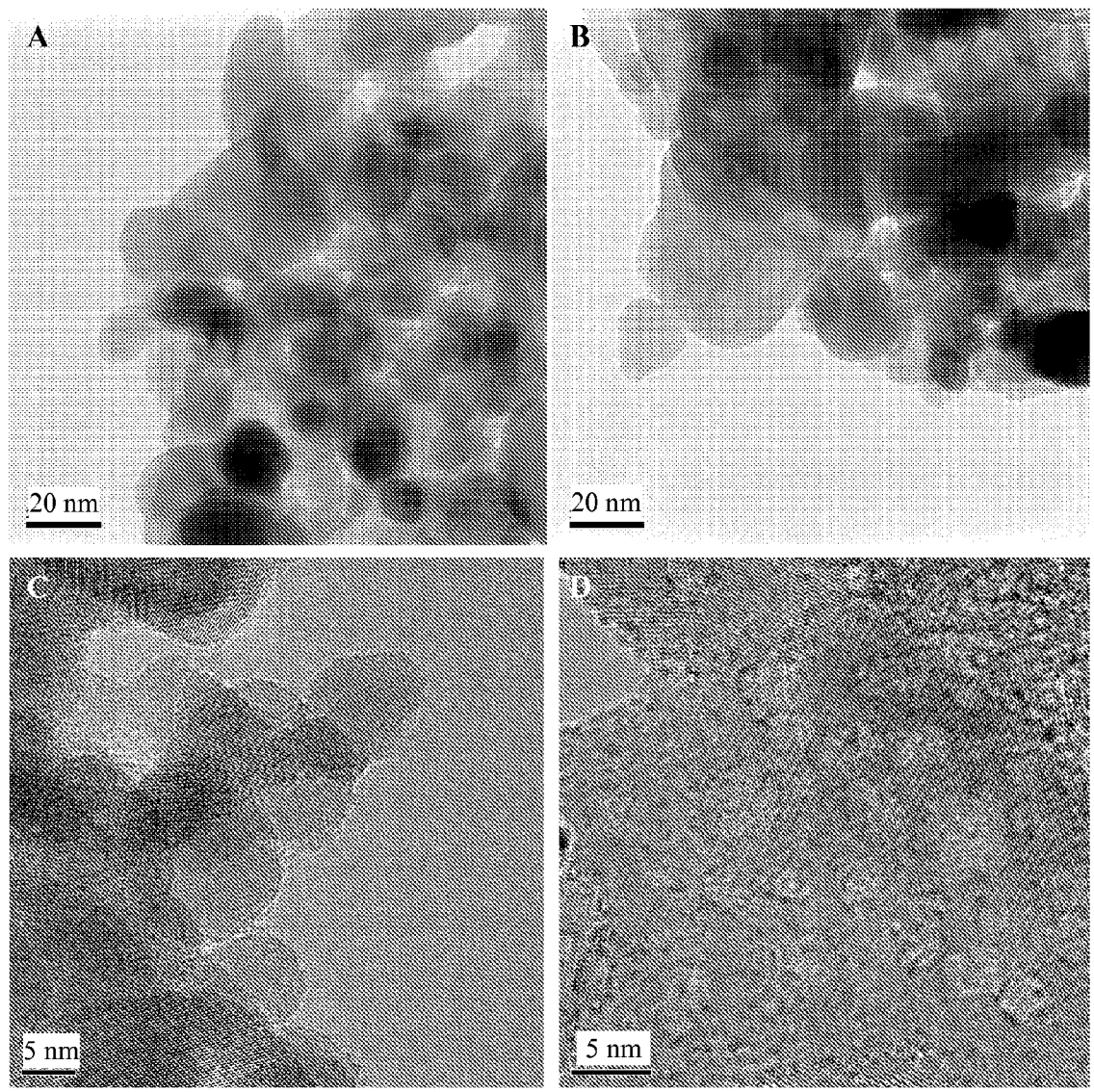
FIG. 4 Transmission Electron Microscopy (TEM). Representative bright field (BF) TEM images of zirconia-supported tungsten oxide catalysts: [A] 2.5 $WZrO_2$-723 K; and [B] (3.5 W+3.5 Zr)/2.5 $WZrO_2$-973 K; and representative high resolution (HR) TEM images of zirconia-supported tungsten oxide catalysts: [C]2.5 $WZrO_2$-723 K; and [D] (3.5 W+3.5 Zr)/2.5 $WZrO_2$-973 K.

Representative BF- and HR-TEM images of the $(WO_x+ZrO_x)WO_3/ZrO_2$ catalysts are shown in FIG. 4. FIGS. 4A and 4C reveal that the model supported 2.5 WZr-723 K sample consists of condensed $ZrO_2$ particles ranging from ~10-50 nm in size (mean size ~25 nm) and selective area diffraction confirms that the m-$ZrO_2$ phase is present. The HR-TEM images of the model supported 2.5 WZr-723 K catalyst only exhibit the m-$ZrO_2$ support lattice fringes and there is no indication of crystalline $WO_3$ NPs (FIG. 4A). EDS mapping confirms that the catalyst surface is rich in W and indicates the presence of dispersed surface $WO_x$ species. Previous HR-TEM studies on the model supported $WZrO_2$ system clearly revealed the crystalline $ZrO_2$ lattice fringes with the additional presence of an amorphous $WO_x$ monolayer and crystalline $WO_3$ NPs (~1 nm in size).

Representative BF and HR-TEM of the co-impregnated samples reveal two different support morphologies which can be described as condensed m-$ZrO_2$ particles ranging from ~10-50 nm in size and a porous structure with pores only a few nm in size. The porous structures found in the $(WO_x+ZrO_x)WO_3/ZrO_2$ catalysts (FIG. 4B) are not observed in the original model supported $WZrO_2$ catalysts (FIG. 4A), but is commonly found in the supported WZrOH catalysts. The BF and HR-TEM images reveal that on both $ZrO_2$ morphologies small dark W rich clusters form with a lateral dimension of ~0.6-0.9 nm, which is similar in size to clusters found in the supported WZrOH catalytic system. Selective area diffraction patterns indicate that the $(WO_x+ZrO_x)WO_3/ZrO_2$ catalysts samples contain both the monoclinic and tetragonal $ZrO_2$ phases. The co-impregnation ZrOH and ammonium metatungstate is responsible for the porous t-$ZrO_2$ phase. The $WO_3$ clusters were found to be on both the porous t-$ZrO_2$ and on the condensed m-$ZrO_2$ supports with the small clusters preferential exhibiting a greater preference towards the t-$ZrO_2$ portion.

The combined UV-vis and Raman studies of the supported $(WO_x+ZrO_x)/WZrO_2$ catalysts indicate that the dehydrated surface $WO_x$ species are present as polymerized surface tungsten oxide species and $WO_3$ NPs. This is reflected by the UV-vis $E_g$ value ~4.2 eV and the corresponding ligand-to-metal charge transfer transitions for each sample. Additionally, the prominent Raman band ~1015 cm$^{-1}$ does not shift to higher wavenumbers. Both techniques suggest that the surface contains polytungstate surface $O_4W=O$ species. Although similar Raman spectra were observed for the $(WO_x+ZrO_x)/WZrO_2$ catalysts compared to their equivalent model supported $WZrO_2$ catalysts, the UV-vis Eg clearly demonstrate that the surface species formed within the $(WO_x+ZrO_x)/WZrO_2$ system are more likely to represent those found in the WZrOH system versus the model supported $WZrO_2$ system. The UV-vis, therefore, suggests that a small amount of Zr-stabilized $WO_3$ NPs co-exist with the polytungstate layer on the $(WO_x+ZrO_x)/WZrO_2$ catalysts, which are not present in the model supported $WZrO_2$ catalysts. We have previously shown that a two-dimensional surface $WO_x$ monolayer coexists with three-dimensional $WO_3$ NPs above monolayer coverage for both the supported WZrOH and model $WZrO_2$ catalyst series. For the model supported $WZrO_2$ catalysts, the $WO_3$ NPs are only present as well-ordered $WO_3$ crystallites, while for the supported WZrOH catalysts just above monolayer (5-8 W/nm$^2$), the $WO_3$ NPs are generally present as Zr-stabilized distorted $WO_3$ NPs at modest calcination temperatures (FIG. 1). Similar UV-vis DRS characteristics of the $(WO_x+ZrO_x)/WZrO_2$ catalysts to the WZrOH yield the possibility that the $(WO_x+ZrO_x)/WZrO_2$ catalysts also possess some Zr-stabilized distorted $WO_3$ NPs. FIG. 1 illustrates the proposed catalytic active sides present in the model supported $WZrO_2$ and the inventive $(WO_x+ZrO_x)/WZrO_2$ catalysts.

Example 4

Reactivity Studies

The rate-determining-step (rds) in methanol dehydration involves the first-order breaking of the C—O bond in the surface CH₃O* intermediate. Because the reaction rate is dependent upon a radical (*) from the catalyst system, the dehydration of methanol is a direct measure of $(WO_x+ZrO_x)/WZrO_2$ catalytic activity.

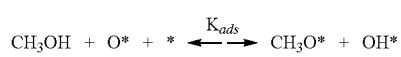 (1)

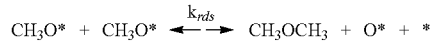 (2)

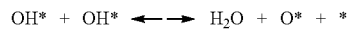 (3)

\* = CUS W Site
\*O = Oxidized Site (Zr or W)
$r = N_s*K_{ads}*k_{rds}*PCH_3OH_2$
$TOF = r/N_s = K_{ads}*k_{rds}*PCH_3OH_2$

4.1 Methanol-Temperature Programmed Surface Reaction (TPSR) Spectroscopy

Methanol-TPSR spectroscopy was performed on an AMI-200 temperature programmed system (ALTAMIRA INSTRUMENTS®) linked via a capillary tube to an inline quadruple mass spectrometer (DYCOR DYMAXION DME200MS™, AMETEK PROCESS INSTRUMENTS®). Typically, ~100 mg of catalyst was loaded in a U-type quartz tube and initially pretreated in flowing air at 723 K (AIRGAS®, Ultra Zero Grade Air, 30 ml/min) for 40 min to remove any possible adsorbed organic impurities and to dehydrate the sample. To ensure that the surface $WO_x$ species remained in a fully oxidized state, the pretreated samples were initially cooled to 383 K, where the gas stream was switched to helium (AIRGAS®, Ultra High Purity, 30 ml/min) to flush out any residual gas phase $O_2$ followed by an additional 30 min at 373 K. At 373 K, methanol was adsorbed by flowing 2000 ppm CH₃OH/He (AIRGAS®, 30 ml/min) mixture for 30 min, and then the system was purged with flowing helium (AIRGAS®, Ultra High Purity, 30 ml/min) for another 30 min to remove any residual physically adsorbed methanol. Next, the sample was heated at a constant rate of 10 K/min to 773 K under flowing helium.

The gases exiting from the quartz tube reactor were analyzed with an online mass spectrometer as a function of catalyst temperature. The following mass spectrometer m/e ratios were employed for the identification of the desorption gases: CH₃OH (m/e=31), H₂CO (m/e=30), CH₃OCH₃(DME) (m/e=45 and 15), CO (m/e=28), $CO_2$ (m/e=44), $H_2O$ (m/e=18) H₃COOCH (MF) (m/e=60) and $(CH_3O)2CH_2$ (DMM) (m/e=75). For those desorbing molecules that gave rise to several fragments in the mass spectrometer, additional m/e values were also collected and identities confirmed. Recent studies demonstrated that the rate-determining-step in methanol dehydration involves the first-order breaking of the C—O bond of the surface CH₃O* intermediate. Furthermore, area under the DME/CH₃OH-TPSR curve corresponds to the number of exposed surface acid sites (N) since the supported $WO_x$-zirconia samples are 100% acidic. By definition, $N_s$ is equal to the surface $ρ_{W,surf}$ density until monolayer coverage is reached since the $WO_x$ surface species are 100% dispersed in the sub-monolayer region. Above monolayer coverage, however, $N_s$ was calculated with the following relationship since not all the $WO_x$ sites in the catalyst are exposed:

$$N_s = \frac{ML\rho_{W,surf} * AboveMLDesorptionArea}{MLDesorptionArea}. \qquad (1)$$

4.2 Methanol-Temperature Programmed Surface Reaction Spectroscopy (TPSR)

Methanol-TPSR dehydration studies were undertaken to chemically probe the nature of the catalytic active sites present in the $(WO_x+ZrO_x)/WZrO_2$ supported catalysts since this reaction is known to readily proceed over surface acidic sites of tungsten oxide. Although the methanol dehydration reaction does not discriminate between surface Lewis and Bronsted acid sites, it does provide quantitative information about the number of exposed acidic surface $WO_x$ catalytic active sites, $N_s$, which is reflected in the area under the DME-TPSR product curve (Table 2).

TABLE 2

Methanol Dehydration, Steady-state TOF and TPSR, $N_s$ Results of the Co-Impregnated "Model" Zironica-Supported Tungsten Oxide Catalysts.

| Sample | Total W-atoms | Ratio W:Zr Added | $N_s$ | TOF ($10^{-2}$ sec$^{-1}$) |
|---|---|---|---|---|
| 2.5WZrO₂-723 K | 2.5 | — | 2.5 | 0.20 |
| (1.5W + 1.5Zr)/2.5WZrO₂-973 K | 5 | 1:1 | 2.5 | 5.8 |
| (3.5W + 3.5Zr)/2.5WZrO₂-973 K | 6 | 1:1 | 3.0 | 20 |
| (3.5W + 7Zr)/2.5WZrO₂-973 K | 6 | 1:2 | 3.1 | 25 |
| (3.5W)/2.5WZrO₂-973 K | 6 | — | 2.5 | 0.58 |
| (3.5Zr)/2.5WZrO₂-973 K | 2.5 | — | 2.5 | 0.20 |
| (3.5W)/(3.5Zr)/2.5WZrO₂-973 K | 6 | 1:1 | 3.0 | 0.45 |
| 4WZrO₂-723 K | 4 | — | 4.0 | 0.28 |
| (2W + 2Zr)/4WZrO₂-973 K | 6 | 1:1 | 3.1 | 6.3 |
| (2W + 4Zr)/4WZrO₂-973 K | 6 | 1:2 | 2.5 | 30 |
| (2Zr)/4WZrO₂-973 K | 4 | — | 4.0 | 0.28 |
| 3.9WZrO₂-723 K | 3.9 | — | 3.9 | 0.25 |
| (4W + 0.4Zr)/3.9WZrO₂-973 K | 7.9 | 10:1 | 4.5 | 71 |
| (4W + 0.7Zr)/3.9WZrO₂-973 K | 7.9 | ~6:1 | 5.5 | 15 |
| (4W + 1Zr)/3.9WZrO₂-973 K | 7.9 | 4:1 | 6.7 | 13 |
| (6W + 0.6Zr)/3.9WZrO₂-973 K | 9.9 | 10:1 | 4.2 | 35 |
| 6WZrO₂-723 K | 6 | — | 3.8 | .68 |
| (2Zr)6WZrO₂-973 K | 6 | — | 3.8 | .68 |
| 4.5WZrO₂-723 K | 4.5 | — | 4.5 | .30 |
| (1.5W + 0.15Zr)/4.5WZrO₂-973 K | 6 | 10:1 | 5.2 | 9.9 |
| (1.5W + 0.375Zr)/4.5WZrO₂-973 K | 6 | 4:1 | 5.5 | 44 |
| (1.5W + 0.5Zr)/4.5WZrO₂-973 K | 6 | 3:1 | 9.1 | 53 |
| (1.5W + 0.75Zr)/4.5 WZrO₂-973 K | 6 | 2:1 | 7.8 | 14 |

TABLE 2-continued

Methanol Dehydration, Steady-state TOF and TPSR, $N_s$ Results of the Co-Impregnated "Model" Zironica-Supported Tungsten Oxide Catalysts.

| Sample | Total W-atoms | Ratio W:Zr Added | $N_s$ | TOF ($10^{-2}$ sec$^{-1}$) |
|---|---|---|---|---|
| 7.6WZrO$_2$-723 K | 7.6 | — | 3.7 | .76 |
| 9.5WZrO$_2$-723 K | 9.5 | — | 3.5 | .89 |

The determined $N_s$ values are listed in Table 2 for the (WO$_x$+ZrO$_x$)/WZrO$_2$ catalysts. Measurements were not undertaken for the initial model supported WZrO$_2$ catalyst samples since they were below monolayer coverage (4.5 W-atoms/nm$^2$) where $N_s$ simply corresponded to the number of W-atoms/nm$^2$. In the sub-monolayer region the dispersion of the supported tungsten oxide phase in the model supported WZrO$_2$ catalysts is 100%. The (WO$_x$+ZrO$_x$)/WZrO$_2$ catalysts experienced a slight increase, with the exception of (mW+nZ)/4 WZrO$_2$ series, in $N_s$ compared to the original surface W density of the model supported WZrO$_2$ catalysts. This suggests a slightly greater number of exposed catalytic active sites present in the (WO$_x$+ZrO$_x$)/WZrO$_2$ catalysts than the model supported WZrO$_2$ catalysts.

4.3 Steady-State Methanol Dehydrogenation to Dimethyl Ether

Steady-state methanol dehydration experiments were conducted in an ambient pressure reactor consisting of a single-pass downflow fixed bed quartz reactor (0.16" ID) packed with finely ground catalyst powder that was held in place by quartz wool. Catalyst amounts of 5-30 mg were chosen to maintain total methanol conversion under 10%, permitting the assumption of differential (i.e., gradientless) reactor conditions. To mimic thermal resistance and estimate catalyst bed temperature, a thermocouple mounted at the same elevation as the catalyst bed was installed inside an identical quartz tube that was fixed to the reactor tube. Both tubes were mounted side-by-side snugly within a 0.5" ID metal tube wrapped in heat tape and insulation.

Pretreatment consisted of calcining each catalyst at 623 K for 30 min in 93 ml/min of a flowing gas mixture of oxygen (Ultra High Purity, AIRGAS®) and helium (Ultra High Purity, AIRGAS®). The O$_2$/He ratio was controlled at an O$_2$—He molar ratio of 14:79 by two independent CORIOLIS™ mass flow controllers. The reactor was then cooled to 573 K and the feed gases were bubbled through a liquid methanol saturator (ALFA AESAR®, ACS grade). The gas phase methanol concentration was controlled by the temperature of an overhead condenser, operated at 281 K for these experiments. The final composition of the reactor feed stream was 7% CH$_3$OH, 14% O$_2$ and 79% He at 100 mL/min total flow (STP=273.15 K, 1 atm).

Steady-state performance was determined by averaging 3-4 gas chromatograph (GC) cycles at 573 K and comparing to initial 373 K temperature runs where each catalyst consistently demonstrated inactivity for methanol conversion. Blank runs without the catalysts demonstrated negligible methanol conversion in the reactor system. The 0.25" OD stainless steel tubing from the reactor outlet to the GC was maintained between 393-423 K by heating tape and insulation to minimize condensation of the reactor effluents. The reactor effluent gases were analyzed by an HP5890 SERIES II™ online GC (HEWLETT PACKARD®), operated in split mode (308 K for 6 min, ramp 20 K/min to 498 K hold for 5 min), with a 10-port VALCO™ valve diverting two samples in parallel through a CP-sil 5CB capillary column (30 m×0.32 mm×5.0 µm, J& W SCIENTIFIC®) to the FID and a 40/60 CARBOXENE-1000™ packed column (5 ft×⅛", SUPELCO®) to the TCD for determination of the methanol conversion, selectivity and activity. The steady-state methanol dehydration catalytic data are expressed in terms of turnover frequency (TOF) by normalizing the reaction rate per exposed surface WO$_x$ site per second.

Figure 5:
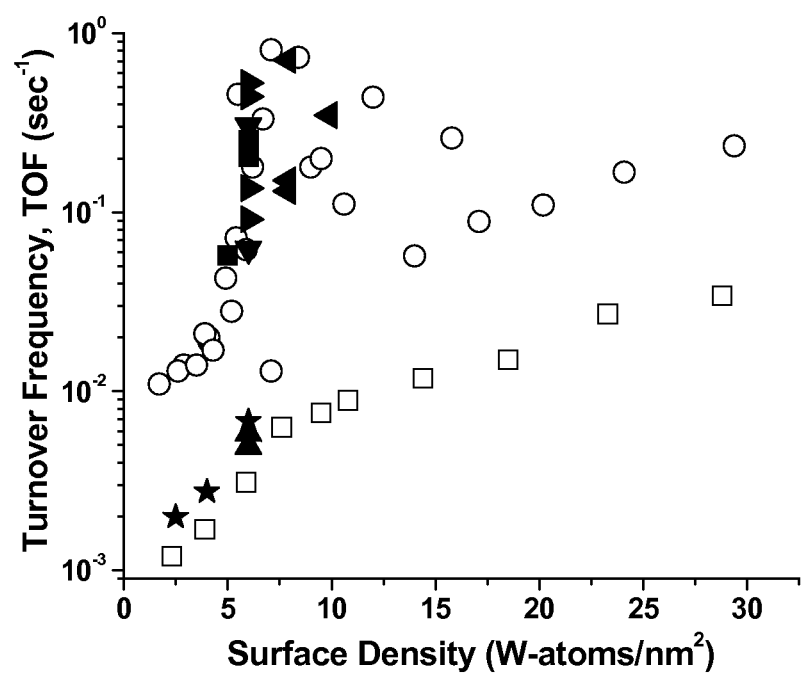
FIG. 5: is a graph depicting catalytic acidity for $CH_3OH$ dehydration to DME over zirconia-supported tungsten oxide catalysts, expressed as TOF, as a function of surface tungsten oxide density (W-atoms/$nm^2$) for "Model" supported xWZrO$_2$-723 K (□); xWZrOH-(773-1173) (○); (mW+nZr)/2.5 $WZrO_2$-973 K (■); (mW+nZr)/3.9 $WZrO_2$-973 K (◀); (mW+nZr)/4 $WZrO_2$-973 K (▼); (mW+nZr)/4.5 $WZrO_2$-973 K (▷); (mW)/2.5 $WZrO_2$-973 K (▲); and (nZr)/x$WZrO_2$-973 K (★).

Steady-state methanol dehydration studies were also undertaken to examine the surface acidic properties of the (WO$_x$+ZrO$_x$)/WZrO$_2$ catalysts. Every catalyst sample was 100% selective to dimethyl ether (DME), which verifies the acidic nature of the supported (WO$_x$+Zr$_y$O$_{4-2y}$)/WZrO$_2$ catalysts. The methanol dehydration reaction rates were converted to TOF by employing the $N_s$ values determined from the CH$_3$OH-TPSR experiments (Table 2) and are shown for the (WO$_x$+ZrO$_x$)/WZrO$_2$ catalysts compared to those found for the supported WZrOH and model supported WZrO$_2$ catalyst systems as a function of $\rho_{W,surf}$ (FIG. 5). The very different TOF values for the model supported WZrO$_2$ and supported WZrOH catalysts has been shown to be related to the presence of the Zr-stabilized distorted WO$_3$ NPs in the supported WZrOH series.

The TOF values for the (WO$_x$+ZrO$_x$)/WZrO$_2$ catalysts are comparable to the supported WZrOH series for a given $\rho_{W,surf}$ (FIG. 5) and are a factor of ~$10^1$-$10^2$ greater than the model supported WZrO$_2$ catalysts. Interestingly, the TOF can vary by ~$10^2$ at the same $\rho_{W,surf}$ value by the composition of the of the co-impregnating (WO$_x$+ZrO$_x$) solution. When only ZrO$_x$ or WO$_x$ were individually added in the impregnation onto the model supported WZrO$_2$ catalysts, there is almost no enhancement in TOF for methanol dehydration (FIG. 5). Turnover enhancements of ~$10^1$-$10^2$ per sec in TOF values could only be achieved by co-impregnating (WO$_x$+ZrO$_x$) solutions onto the model supported WZrO$_2$ catalysts to achieve the inventive catalysts. Even trace amounts of ZrO$_x$ in the co-impregnating solution are sufficient to give rise to TOF enhancements of $10^1$-$10^2$ (Table 2).

Published trends have suggested that active site formation leading to high turnover rate is induced by maximum polytungstate concentration with low WO$_3$ presence. This work demonstrates the addition of surface (WO$_x$+ZrO$_x$) species to model WZrO$_2$ catalysts increases catalytic activity 100 fold, contrary to the implication of polytungstates as the active site for acid catalysis. The additional surface (WO$_x$+ZrO$_x$) as Zr-stabilized distorted WO$_3$ NPs increases acidic TOF activity of the (WO$_x$+ZrO$_x$)/WZrO$_2$ catalysts (FIG. 5, Table 2). The TOF of (WO$_x$+ZrO$_x$)/WZrO$_2$ "mimics" that of the supported WZrOH system which contains the Zr-stabilized WO$_3$ NPs.

The addition of surface ZrO$_x$ or surface WO$_x$ in the absence of the other and calcined under the same conditions yields a catalyst with negligible activity change from the model supported WZrO$_2$ catalysts (FIG. 5). Without being bound by any theory, the belief that the surface ZrO$_x$ is incorporated into the underlying crystalline ZrO$_2$ support, or the surface WO$_x$ is incorporated into the WO$_3$ NPs, as well as the fact that the activity was not changed, shows that the activity of the active sites was not altered. In order to achieve an enhanced activity such as that found in the WZrOH series, both surface $WO_x$ and surface $ZrO_x$ must undergo phase transformation together to form the active Zr-stabilized $WO_3$ NP. A Zr-stabilized distorted $WO_3$ NPs is the catalytic active site created by co-impregnation of the $WZrO_2$ solid support with $WO_x$ and $Zr_yO_{4-2y}$.

The TEM analysis revealed that the $(WO_x+ZrO_x)/WZrO_2$ catalysts consisted of both the m-$ZrO_2$ and t-$ZrO_2$ support phases, with the later possessing a porous structure. Raman spectroscopy detected a decrease in formation of crystalline $WO_3$ nanoparticles (NPs) and an increase in Zr-stabilized $WO_3$ NPs. The corresponding UV-vis DRS $E_g$ values were just slightly higher than that for the model supported $WO_3/ZrO_2$ catalysts at the same surface tungsten oxide density. The TOF for methanol dehydration to dimethyl ether over the surface acid sites was found to increase by as much as $\sim 10^2$ only when $WO_x$ and $ZrO_x$ were co-impregnated on the model supported $WO_3/ZrO_2$ catalysts. The enhanced TOF is shown to be related to the formation of the Zr-stabilized distorted $WO_3$ NPs through the co-impregnation process.

The current study conclusively proves that a model $WZrO_2$ catalyst with minimal activity can by altered to possess enhanced activity similar to that found for the super-active WZrOH catalysts through co-impregnation of surface ($WO_x$+$ZrO_x$) species. The fact the neither surface $MO_x$ species can enhance the activity individually or under the incorrect calcination procedures emphasizes that both surface species are required in the appropriate structure for the correct active site to be produced.

What is claimed is:

1. A method of making a catalyst comprising impregnating a substrate with a W precursor and a Zr precursor to form an impregnated support, and calcining the impregnated support to generate a $WO_xZrO_2$ nanoparticle catalyst, and wherein said Zr precursor is zirconium tert-butoxide, $Zr[OC(CH_3)_3]_4$.

2. A method of making a catalyst comprising impregnating a substrate with a W precursor and a Zr precursor to form an impregnated support, and calcining the impregnated support to generate a $WO_xZrO_2$ nanoparticle catalyst, and wherein said W precursor is ammonium metatungstate $(NH_4)10W_{12}O_{41} \cdot 5H_2O$.

3. A method of making a catalyst comprising:
impregnating a support with zirconium oxide to form a Zr-impregnated support,
further impregnating the Zr-impregnated support with tungsten oxide to form a ZrW-impregnated support, and
calcining the ZrW-impregnated support, thereby providing a catalyst composition comprising $WO_xZrO_2$ nanoparticles,
wherein said support consists of $WO_x/SiO_2$, $WO_x/Al_2O_3$, or $WO_x/(SiO_2-Al_2O_3)$.

* * * * *

UNITED STATES PATENT AND TRADEMARK OFFICE
CERTIFICATE OF CORRECTION

Page 1 of 1

PATENT NO. : 8,455,392 B2
APPLICATION NO. : 12/665692
DATED : June 4, 2013
INVENTOR(S) : Wachs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 591 days.

Signed and Sealed this
Sixteenth Day of December, 2014

Michelle K. Lee
*Deputy Director of the United States Patent and Trademark Office*